United States Patent [19]

Maru et al.

[11] Patent Number: 4,544,180

[45] Date of Patent: Oct. 1, 1985

[54] TRAILING LINK TYPE BEAM SUSPENSION

[75] Inventors: Hideki Maru, Wako; Tetsuro Mitsui, Niiza, both of Japan

[73] Assignee: Honda Giken Kogyo Kabushiki Kaisha, Tokyo, Japan

[21] Appl. No.: 571,463

[22] Filed: Jan. 17, 1984

[30] Foreign Application Priority Data

Feb. 1, 1983 [JP] Japan .................................. 58-15147

[51] Int. Cl.$^4$ ............................................. B60G 21/04
[52] U.S. Cl. ..................... 280/689; 280/721
[58] Field of Search ............... 280/689, 665, 700, 721, 280/723, 726, 725

[56] References Cited

U.S. PATENT DOCUMENTS

| 3,222,083 | 12/1965 | Stotz | 280/721 |
| 4,415,178 | 11/1983 | Hatsushi | 280/721 |

FOREIGN PATENT DOCUMENTS

| 84210 | 5/1982 | Japan | 280/689 |
| 130804 | 8/1982 | Japan | 280/726 |
| 53506 | 3/1983 | Japan | 280/726 |

*Primary Examiner*—Joseph F. Peters, Jr.
*Assistant Examiner*—Everett G. Diederiks, Jr.
*Attorney, Agent, or Firm*—Roberts, Spiecens & Cohen

[57] ABSTRACT

A trailing link type beam suspension suitable for use as the rear suspension of a front-drive type automobile. The beam suspension comprises a hollow axle beam having a left first end and a right second end to which left and right wheels are connected rotatably; a first trailing arm having one end fixed to the first end of the axle beam and the other end connected to the chassis; a second trailing arm having one end rotatably connected to the second end of the axle beam and the other end connected to the chassis; a stabilizer received by the hollow axle beam and having one end fixed to the first end of the axle beam and the other end swingably supported by the second end of the axle beam; and a link through which the other end of the stabilizer is connected to the second trailing arm. The stabilizer may be composed of a torque tube received by the hollow axle beam and fixed at one end to a portion of the latter adjacent to the second end thereof, and a torsion bar non-rotatably fixed at its one end to the other end of the torque tube and swingably supported at its other end by the one end of the torque tube.

17 Claims, 4 Drawing Figures

TRAILING LINK TYPE BEAM SUSPENSION

BACKGROUND OF THE INVENTION

1. Field of the Invention

The present invention relates to a trailing link type beam suspension and, more particularly, to a beam suspension employing a pair of trailing arms, one of which is fixed to an axle beam while the other is rotatably connected to the axle beam.

2. Description of the Prior Art

In a trailing link type beam suspension of the kind described, when the wheel at one side of a vehicle is lifted, the axle beam on the same side is rotated upwardly around the point of connection of the trailing arm of that side to the chassis. However, the rotation of the axle beam relative to the chassis or the trailing arm is not transmitted to the trailing arm of the other side, so that the wheel at the other side of the vehicle does not move up and down following the vertical movement of the wheel at the one side of the vehicle. This type of suspension, therefore, is suitable for use as the rear suspension of a front-wheel drive automobile.

In general, however, this type of beam suspension encounters a problem that, if the trailing arms of both sides of the vehicle are rocked freely and independently, the angle of roll of the chassis during turning of the vehicle is increased to undesirably impair the running stability of the vehicle. This gives rise to the need for a stabilizer which does not perform any spring action when the wheels at both sides are moved up and down simultaneously but produces, when the vehicle is rolled, a moment which resists the rolling force.

Such stabilizer, when mounted simply between the trailing arms of both sides, requires a space for the mounting of the stabilizer.

SUMMARY OF THE INVENTION

The present invention has been achieved in order to solve the above-described problems of the prior art.

Namely, it is a first object of the invention to provide a trailing link type beam suspension employing a stabilizer for producing a moment which resists the relative swinging motion between both trailing arms, wherein the stabilizer does not require any specific space for the mounting thereof and it can be protected without requiring any specific protection member.

It is a second object of the invention to provide a trailing link type beam suspension incorporating a stabilizer, which is improved to eliminate the necessity for the specific space for the mounting of the stabilizer and to reduce the weight without imparing the strength.

To achieve the first object mentioned above, the invention provides a trailing link type beam suspension comprising: a hollow axle beam having a left first end and a right second end to which left and right wheels are connected rotatably; a first trailing arm having one end fixed to the first end of the axle beam and the other end connected to the chassis; a second trailing arm having one end rotatably connected to the second end of the axle beam and the other end connected to the chassis; a stabilizer received by the hollow axle beam and having one end fixed to the first end of the axle beam and the other end swingably supported by the second end of the axle beam; and a link through which the other end of the stabilizer is connected to the second trailing arm.

In order to achieve the second object mentioned above, the invention provides a trailing link type beam suspension comprising: a hollow axle beam having a left first end and a right second end to which left and right wheels are connected rotatably; a first trailing arm having one end fixed to the first end of the axle beam and the other end connected to the chassis; a second trailing arm having one end rotatably connected to the second end of the axle beam and the other end connected to the chassis; a stabilizer composed of a torque tube received by the hollow axle beam and having one end fixed to the portion adjacent to the second end of the axle beam and a torsion bar having one end non-rotatably connected to the other end of the torque tube and the other end swingably supported by one end of the torque tube; and a link through which the other end of the torsion bar is connected to the second trailing arm.

BRIEF DESCRIPTION OF THE DRAWINGS

The above and other objects, features and advantages of the invention will become clear from the following description of the preferred embodiments taken in conjunction with the accompanying drawings in which.

DESCRIPTION OF THE PREFERRED EMBODIMENTS

Figure 1:
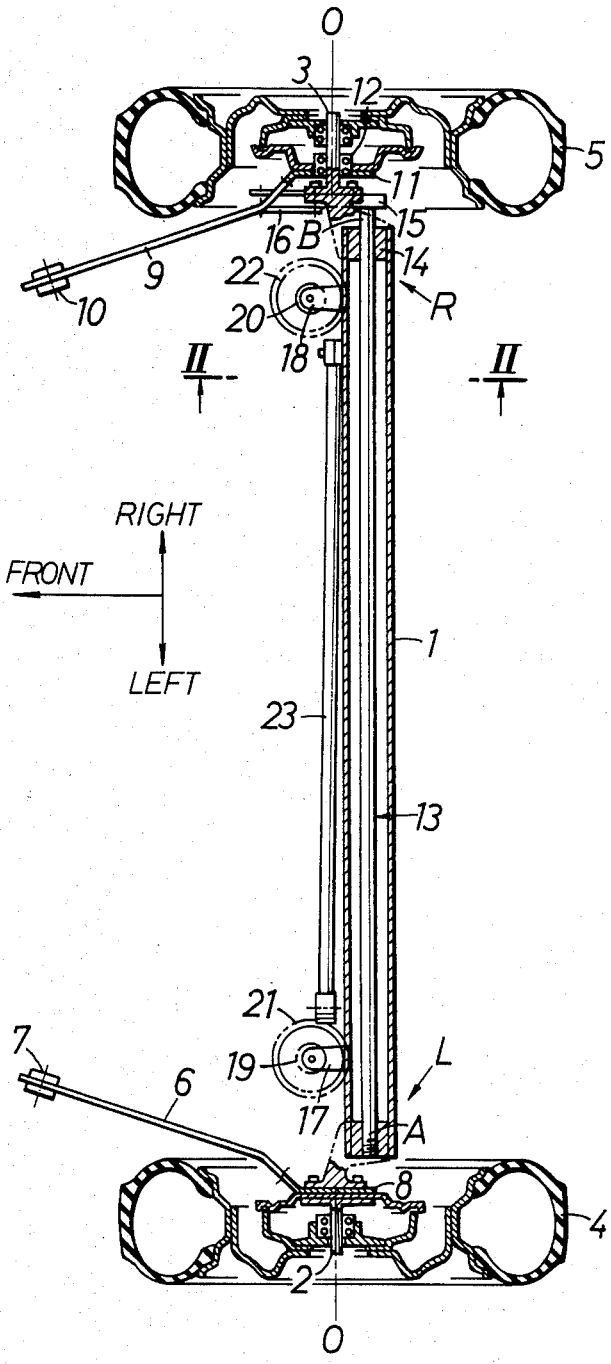
FIG. 1 is a sectional plan view of a first embodiment of the trailing link type beam suspension in accordance with the invention.
Figure 2:
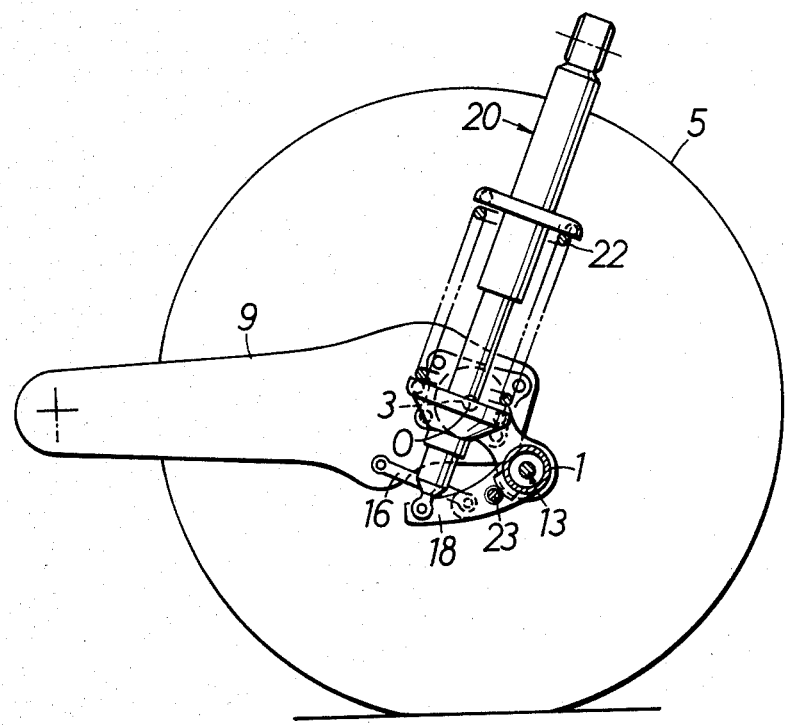
FIG. 2 is a cross-sectional view of an essential part taken along line II—II of FIG. 1.

Two preferred embodiments of the invention will be described hereinunder with reference to the accompanying drawings. Throughout the description of these embodiments, the same reference numerals are used to denote the same or corresponding parts or members. Referring first to FIGS. 1 and 2 showing a first embodiment, axles 2 and 3 are fixed to left and right ends, i.e. to first end L and second end R of the axle beam 1. A left wheel 4 and a right wheel 5 are rotatably secured to the axles 2 and 3, respectively. The axle beam 1 is disposed to the of and below the axis O of rotation of the wheels 4 and 5.

Referring first to FIG. 1, a first trailing arm 6 disposed at the left side is connected at its front end 7 to a chassis (not shown) for undergoing pivotal movement around an axis which extends almost transversely of the chassis. The rear end 8 of the first trailing arm 6 is fixed to the axle 2, i.e. to the first end L of the axle beam.

On the other hand, a second trailing arm 9 disposed at the right side is connected at its front end 10 to the chassis for pivotal movement around an axis which extends almost transversely of the chassis. The rear end 11 of the second trailing arm 9 is rotatably connected to the axle 3, i.e. to the second end R of the axle beam 1 through a rocking bearing 12. When the wheels 4 and 5 move up and down, the trailing arms 6 and 9 swing up and down around the points of their connection to the chassis so as to permit the up and down movement of the wheels but preventing the wheels 4 and 5 from moving in the back and forth direction relative to the chassis.

The axle beam 1 is a hollow tubular member receiving a stabilizer 13. The stabilizer 13 is constructed as a torsion bar. The left end A of the stabilizer is connected to the first end L of the axle beam 1 through, for example, serrations so as not to rotate with respect to the axle beam 1. On the other hand, the other end, i.e. the right end B is rotatably supported by the second end R of the axle beam 1 by means of a stabilizer bearing 14. The other end B of the stabilizer 13 projects beyond the second end R of the axle beam 1. A link 16 which serves as a control arm is connected between an anchor arm 15 integral with the other end B and the second trailing arm 9.

The left and right ends of the axle beam 1 are provided with arms 17 and 18 extending forwardly therefrom. Dampers 19 and 20 are rotatably connected between the chassis and the arms 17 and 18, respectively. As will be seen from FIG. 2, the dampers 19 and 20 are disposed such that their axes extend to pass points located in close proximity to the axes O of respective wheels 4 and 5. Coil springs 21 and 22 are disposed coaxially with the dampers 19 and 20 for resiliently supporting the axle beam 1 on the chassis.

A panhard rod 23, which is disposed in the vicinity of a vertical plane passing through the axis O of rotation of the wheels 4, 5, is pivotally connected at one end to a front portion of the axle beam 1 for pivotal movement around an axis which extends substantially parallel to the longitudinal axis of the chassis. The other end of the panhard rod 23 is pivotally secured to the chassis so that the panhard rod 23 serves to limit the relative movement between the axle beam 1 and the chassis in the lateral direction.

The operation of the beam suspension having the described construction is as follows. When the left and right wheels 4 and 5 move up and down simultaneously due to an unevenness of the road surface, both trailing arms 6 and 9 are swung up and down around the points at which the front end portions 7, 10 thereof are connected to the chassis. Accordingly, the panhard rod 23 also swings up and down around the point at which it is connected to the chassis. Consequently, the axle beam 1 is moved up and down while being held parallel to the chassis. The movement of the axle beam 1 is absorbed by coil springs 21, 22 and the dampers 19, 20.

When one of the wheels, e.g. the left wheel 4, tends to move upwardly relative to the chassis due to, for example, cornering, the left first trailing arm 6 swings upwardly around its front end 7. The axle beam 1, which is connected at its first end L to the trailing arm 6, rotates in the counter-clockwise direction as viewed in FIG. 2 as a result of the swinging of the trailing arm 6. Consequently, one end A of the stabilizer 13 fixed to the axle beam 1 is rotated in the same direction. On the other hand, the second trailing arm 9, which is pivotally connected to the second end L of the axle beam 1, is freed from the swinging of the axle beam 1 and tends to keep its position unless the wheel 5 moves up and down. On the other hand, the other end B of the stabilizer 13, which is connected to the trailing arm 9 through the link 16, does not rotate with respect to the chassis unless the trailing arm 9 is swung. Consequently, the stabilizer 13 is twisted by the forces acting on both ends A and B thereof, thereby to produce a force which resists the relative movement between the wheels 4 and 5. As a result, the roll angle of the chassis is diminished to improve the stability of the vehicle.

When the right wheel 5 is moved upward, the second trailing arm 9 is swung upwardly to cause a rotation of the other end B of the stabilizer with respect to the chassis. On the other hand, the first trailing arm 6 is not swung unless the left wheel 4 is moved up and down, so that the axle beam 1 and end A of the stabilizer fixed to the axle beam 1 are never swung with respect to the chassis. Consequently, twisting force is applied to the stabilizer 13 by the forces applied to both ends A and B thereof to resist the lifting of the right wheel 5.

Thus, when either one of the left and right wheels 4 and 5 is moved up and down, the stabilizer 13 produces a moment which acts to resist such relative movement of the wheels.

In the illustrated embodiment, the axes of the dampers 19 and 20 extend to pass the points which are very close to the axes of the wheels 4 and 5. According to this arrangement, it is possible to diminish the difference of the damping forces between the dampers 19 and 20 caused by the difference of angle of swing between both trailing arms 6 and 9. In addition, by disposing the panhard rod 23 in the vicinity of a vertical plane passing through the axis O of rotation of the wheels 4 and 5, it is possible to reduce the amount of deviation of the wheels 4 and 5 by external force, improving the running stability of the vehicle.

Figure 3:
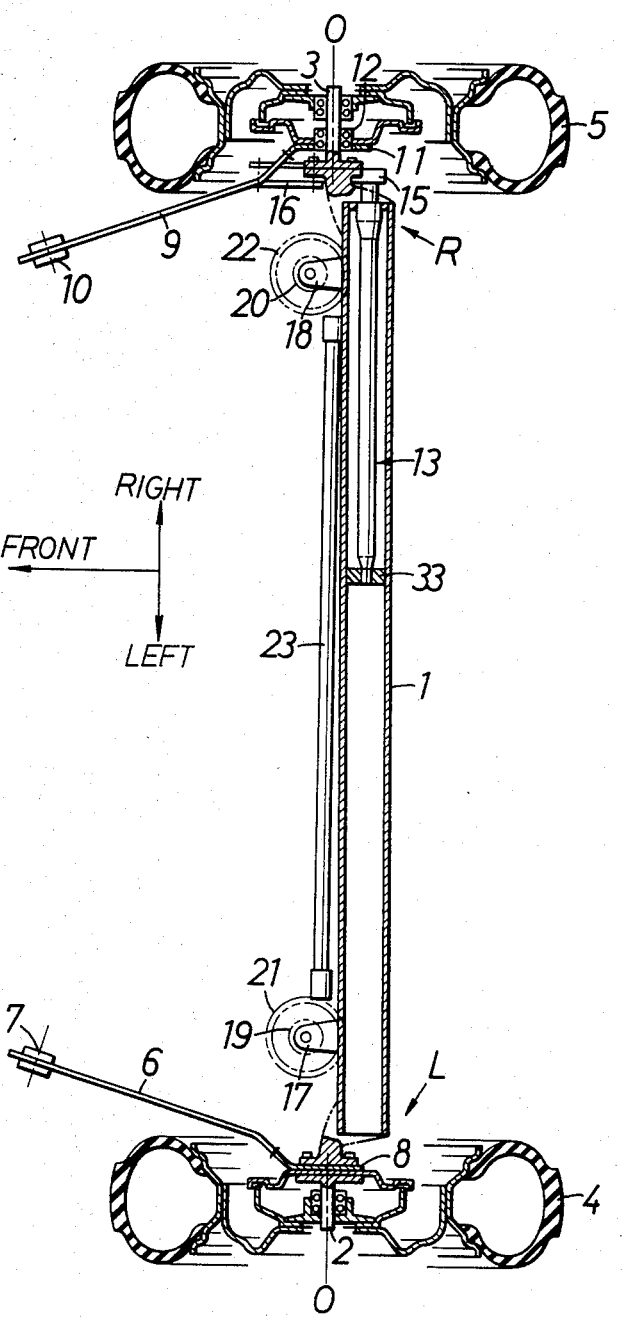
FIG. 3 is a sectional plan view in a second embodiment of the beam suspension in accordance with the invention.
Figure 4:
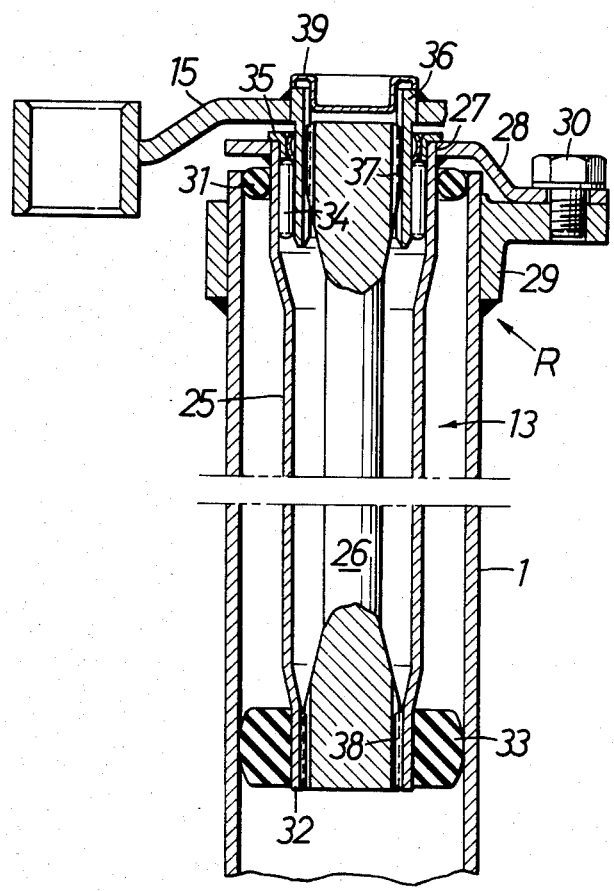
FIG. 4 is a sectional plan view of an essential part of the stabilizer as shown in FIG. 3.

FIGS. 3 and 4 show a second embodiment of the invention which is substantially identical to the first embodiment except for the construction of the stabilizer 13 and the construction of the connection between the stabilizer 13 and the axle beam 1.

As shown clearly in FIG. 4, in the described embodiment, the axle beam 1 is a hollow tubular member which receives the stabilizer 13. The stabilizer 13 is constituted by a torque tube 25 which is inserted from the second end R of the axle beam 1 and a torsion bar 26 which is provided in the torsion tube 25. One end 27 of the torque tube 25 projects outwardly beyond the second end R of the axle beam 1. A torque tube plate 28 is fixed to the projected end 27. On the other hand, a hub carrier 29 for supporting the axle 3 is fixed to the second end R of the axle beam 1. The torque tube plate 28 is fastened to the hub carrier 29 by means of bolts 30. Therefore, the one end 27 of the torque tube 25 is fixed to the hub carrier 29, i.e. to the axle beam 1. A rubber seal ring 31 disposed between the one end 27 of the torque tube 25 and the axle beam 1 is adapted to prevent muddy water from entering the axle beam 1. On the other hand, the other end 32 of the torque tube 25 is inserted into the axle beam 1 to an intermediate depth thereof and is held by a ring-shaped holding member 33 made of rubber.

A cylindrical body 36 is rotatably received by the one end 27 of the torque tube, through the intermediary of a bearing 34 and a sealing member 35 which serves to prevent muddy water or the like from coming into contact with the bearing 34. Spline grooves 37 are formed in the inner peripheral surface of the cylindrical member 36, while spline grooves 38 are also formed in the inner surface of the other end 32 of the torque tube 25. Spline grooves for meshing engagement with the abovementioned spline grooves 37 and 38 are formed on the outer surface of both ends of the torsion bar 26. The torsion bar 26 is splined at its one end (lower end as viewed in FIG. 4) to the other end 32 of the torque tube 25, while the other end (upper end as viewed in FIG. 4) is splined to the cylindrical member 36. Therefore, the torsion bar 26 is connected at its one end to the other end 32 of the torque tube 25 in a non-rotatable manner and is rotatably supported by one end 27 of the torque tube 25. The outer open end of the cylindrical body 36 is closed by a cap 39. An arm 15 is fixed to the cylindrical member 36. A link 16 serveable as a control arm is connected between the arm 15 and the second trailing arm 9.

The beam suspension of this embodiment operates in a manner explained hereinunder. When the left and right wheels 4 and 5 move up and down simultaneously, the left and right trailing arms 6 and 9 swing up and down around the points of connection to the chassis at the front ends 7 and 10 thereof, so that the panhard rod 23 also swings up and down around the point at which it is connected to the chassis. Consequently, the axle beam 1 moves up and down while being held parallel to the chassis. This movement of the axle beam 1 is absorbed by the coil springs 21, 22 and the dampers 19, 20.

Assuming here that one of the wheels, e.g. the left wheel 4, tends to move upwardly relative to the chassis, the left first trailing arm 6 is swung upwardly around the pivot connection at the front end 7 thereof. Since the first end L of the axle beam 1 is fixed to the trailing arm 6, the axle beam 1 can swing relative to the chassis as in the first embodiment, in accordance with the swinging of the trailing arm 6. On the other hand, the second trailing arm 9, which is pivotally connected to the second end R of the axle beam 1, is free from the swinging of the axle beam 1, so that it tends to keep its state unless the wheel 5 is moved up and down. The outer end of the torsion bar 26 of the stabilizer 13 is connected to the second trailing arm 9 through the cylindrical member 36, arm 15 and the link 16, so that the torsion bar 26 is never swung with respect to the chassis unless the second trailing arm 9 rotates. Therefore, the torsion bar 26 and the torque tube 25 are deformed torsionally to produce a moment which resists the relative movement between the wheels 4 and 5. Consequently, the angle of rolling of the chassis is diminished to improve the stability of the vehicle.

When the right wheel 5 is lifted, the second trailing arm 9 is swung upwardly so that the other end of the torsion bar 26 tends to rotate relative to the chassis. On the other hand, the first trailing arm 6 is never swung unless the left wheel 4 is moved up and down, so that the axle beam 1 and the torque tube 25 fixed thereto do not rotate with respect to the chassis. As a result, the torque tube 25 and the torsion bar 26 are torsionally deformed to suppress the lifting of the right wheel 5. Thus, the stabilizer 13 produces a moment which resists any up and downward movement of either one of the left and right wheels 4 and 5.

The arrangement may be such that the one end 27 of the torque tube 25 is directly fixed to the axle beam 1.

As has been described, according to the second embodiment, the stabilizer is disposed in a hollow axle beam and is composed of a torque tube having one end fixed to the second end of the axle beam, and a torsion bar having one end fixed non-rotatably to the other end of the torque tube and the other end rotatably supported by the one end of the torque tube. With this arrangement, the length and the diameter of the stabilizer are never limited even though the spring constant is once determined. Rather, the length and the diameter of the torsion bar can be determined freely within the size of the hollow space in the axle beam, in accordance with the determined spring constant. Consequently, according to the invention, it is possible to design the stabilizer to have the minimal required strength, i.e. minimal weight, thereby to reduce the weight of the beam suspension as a whole.

Although the invention has been described with reference to specific configurations, it will be clear to those skilled in the art that the described embodiments are not exclusive and various changes and modifications may be imparted thereto without departing from the spirit and scope of the invention which are limited solely by the appended claims.

What is claimed is:

1. A trailing link type beam suspension comprising:
    a hollow axle beam having first and second ends at each of which a wheel is connected rotatably;
    a first trailing arm having one end fixed to the first end of said axle beam and the other end connected to the chassis of a vehicle;
    a second trailing arm having one end rotatably connected to the second end of said axle beam and the other end connected to said chassis;
    a stabilizer means in said hollow axle beam and having one end fixed to the first end of said axle beam and the other end swingably supported by the second end of said axle beam; and
    a link connecting the other end of said stabilizer means to said second trailing arm.

2. A trailing link type beam suspension as claimed in claim 1, wherein said stabilizer means comprises a torsion bar.

3. A trailing link type beam suspension as claimed in claim 2, wherein said torsion bar has a longitudinal axis offset from the rotational axes of the wheels around said first and second ends of the axle beam.

4. A trailing link type beam suspension as claimed in claim 3 comprising a panhard rod disposed in the vicinity of a vertical plane passing through the rotational axes of the wheels, said panhard rod having one end pivotably connected to the axle beam and another end pivotably connected to the chassis.

5. A trailing link type beam suspension as claimed in claim 3 comprising damping means connected to the axle beam and to the chassis for damping movement of the axle beam, said damping means undergoing movement along an axis upon damping the movement of the axle beam, the axis of movement of the damping means extending along a line passing in close proximity to the rotational axes of the wheels.

6. A trailing link type beam suspension as claimed in claim 2, wherein said torsion bar extends substantially along the entire length of the hollow axle beam and projects beyond said second end thereof for attachment to said link.

7. A trailing link type beam suspension as claimed in claim 6 comprising bearing means in said axle beam rotatably supporting said torsion bar.

8. A trailing link type beam suspension comprising:
    a hollow axle beam having first and second ends at each of which a wheel is connected rotatably;
    a first trailing arm having one end fixed to the first end of said axle beam and the other end connected to the chassis of a vehicle;
    a second trailing arm having one end rotatably connected to the second end of said axle beam and the other end connected to said chassis;
    a stabilizer means including a torque tube in said hollow axle beam and having one end fixed to the portion adjacent to said second end of said axle beam and a torsion bar having one end non-rotatably connected to the other end of said torque tube and the other end rotatably supported by the one end of said torque tube; and a link connecting the other end of said torsion bar to said second trailing arm.

9. A trailing link type beam suspension as claimed in claim 8, wherein said torsion bar has a longitudinal axis offset from the rotational axes of the wheels around said first and second ends of the axle beam.

10. A trailing link type beam suspension as claimed in claim 9 comprising a panhard rod disposed in the vicinity of a vertical plane passing through the rotational axes of the wheels, said panhard rod having one end pivotably connected to the axle beam and another end pivotably connected to the chassis.

11. A trailing link type beam suspension as claimed in claim 9 comprising damping means connected to the axle beam and to the chassis for damping movement of the axle beam, said damping means undergoing movement along an axis upon damping the movement of the axle beam, the axis of movement of the damping means extending along a line passing in close proximity to the rotational axes of the wheels.

12. A trailing link type beam suspension as claimed in claim 8, wherein said torsion bar extends within said torque tube, the suspension further comprising bearing means in said torque tube at said one end thereof for rotatably supporting said torsion bar thereat.

13. A trailing link type beam suspension as claimed in claim 12 further comprising a cylindrical member rotatably received in the torque tube and non-rotatably connected to said other end of said torsion bar, and an anchor arm fixed to said cylindrical member, said link connecting said anchor arm to said second trailing arm.

14. In a trailing link type beam suspension comprising:

an axle having first and second ends at each of which a wheel is connected rotatably;

a first trailing arm having one end fixed to the first end of said axle beam and the other end pivotably connected to the chassis of a vehicle; and a second trailing arm having one end rotatably connected to the second end of said axle beam and the other end pivotably connected to said chassis;

the improvement, wherein the axle beam is tubular and hollow and comprising stabilizer means in said hollow axle beam for resisting relative rotation thereof due to differential up and down movement of the wheels, said stabilizer means including a torsion bar having first and second ends, means securing one of the ends of the torsion bar to the axle beam, means rotatably supporting the second end of the torsion bar from the axle beam, and a link rotatably connecting said torsion bar to said second trailing arm.

15. The improvement as claimed in claim 14, wherein said torsion bar has a longitudinal axis offset from the rotational axes of the wheels around said first and second ends of the axle beam.

16. The improvement as claimed in claim 15 comprising a panhard rod disposed in the vicinity of a vertical plane passing through the rotational axes of the wheels, said panhard rod having one end pivotably connected to the axle beam and another end pivotably connected to the chassis.

17. The improvement as claimed in claim 15 comprising damping means connected to the axle beam and to the chassis for damping movement of the axle beam, said damping means undergoing movement along an axis upon damping the movement of the axle beam, the axis of movement of the damping means extending along a line passing in close proximity to the rotational axes of the wheels.

* * * * *